June 22, 1948.  J. A. KRATZ  2,443,658
RECTIFIER SYSTEM
Filed Sept. 9, 1943
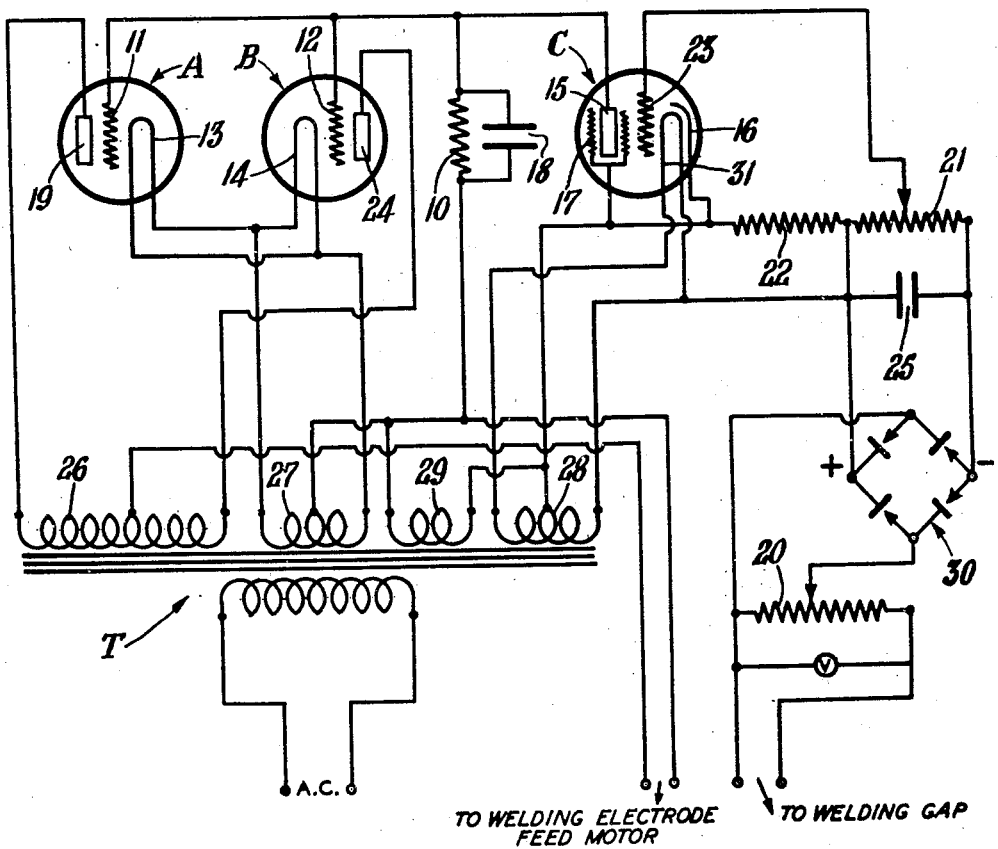
INVENTOR
JOHN A. KRATZ
BY
ATTORNEY Patented June 22, 1948

2,443,658

UNITED STATES PATENT OFFICE 2,443,658

RECTIFIER SYSTEM

John A. Kratz, Bronxville, N. Y., assignor to The Linde Air Products Company, a corporation of Ohio Application September 9, 1943, Serial No. 501,594

8 Claims. (Cl. 175—363)

1

This invention relates to electrical control systems and more particularly refers to a system for delivering electric current impulses to a circuit at a rate controlled by variations in the voltage of another circuit.

The invention is intended primarily for use to control the speed of a motor in response to variations in the voltage of a circuit involving apparatus operated wholly or in part by such motor, for instance to control the speed of a welding electrode feeding motor in response to variations in the voltage drop across the welding gap caused by variations in the length of the gap between the electrode and a workpiece. Accordingly, the invention will be described in connection with that use; but it will be apparent that the invention is readily adaptable to other uses requiring a similar type of electrical control.

One system in successful use for operating and controlling an electrode feeding motor comprises a source of alternating current; one or, more usually, a pair of thermionic electric valves arranged to give half or full wave rectification of the current; a direct current electrode feeding motor driven by the rectified current; and a grid biasing circuit for impressing upon the grids of the valves a potential of a valve which shuts off (renders non-conductive) the valves when the voltage drop across the welding gap decreases below a predetermined value. The valves used are of the kind in which a control grid controls only the starting and stopping of the discharge, the full opening or closing of the valve being accomplished by application of a grid bias respectively less or more negative (or respectively more or less positive) than a critical bias value characteristic of the valve. The system may be adjusted to feed an electrode at a desired constant speed as long as, and only as long as, the welding gap exceeds a desired length.

The biasing circuit usually comprises a potentiometer impedance connected either directly across the welding gap when direct current welding is used or across the output terminals of a rectifier in turn connected across the welding gap if alternating current welding is used. Such systems are shown and described in my Patent 2,282,522, issued May 12, 1942, and in Patent 2,260,510, Edwin A. Clapp, issued October 28, 1941.

Available thermionic valves having characteristics adapting them for use in such systems for controlling and operating an electrode feed motor of usual power are also characterized by a range of critical grid bias voltages rather than by a single critical voltage. A small change in voltage within

2 this range will neither open a closed valve nor close an open valve. Furthermore, the critical voltage range shifts in width and value with changes of the temperature of the valve.

Another difficulty in operating within this range of critical voltages is that of obtaining properly synchronized operation of two valves. Means are available for synchronizing the valves, but such means increase the size, weight, and cost of the control apparatus.

The principal object of this invention is to provide a thermionic control system of the character described, for delivering direct current to one circuit while, and only while, the voltage in a second circuit exceeds a desired value, which system is simple, compact, inexpensive, fully automatic, sensitive to small changes in the voltage in the second circuit near the desired value, and relatively insensitive to changes in the temperature of the various parts.

The electronic system of this invention comprises, in essentials, a transformer having a suitably tapped secondary as more fully described below; a pair of triode thermionic electric valves or space discharge rectifier devices adapted and arranged to receive alternating current from said transformer and to deliver full-wave rectified current to an electrode feed motor (or other device to be operated at a controlled rate); a potentiometer resistor connected to receive unidirectional current at a voltage directly related to the welding voltage, and being connected across the welding gap through a rectifier which will pass direct current or rectify alternating current; and a trigger circuit comprising a thermionic valve or space discharge rectifier device so connected as to be responsive to voltage changes across said resistor to deliver or refrain from delivering halfwave rectified current to its anode-cathode circuit, to which circuit is connected the grid-cathode circuit of the said pair of triodes. The last-mentioned thermionic valve may be a small tube, insensitive to temperature changes, characterized by a sharply critical grid-bias voltage, and arranged to deliver current at a desired high voltage in response to a small applied grid bias voltage change.

The invention will be more specifically described with reference to the accompanying drawing which illustrates a preferred electrical circuit.

In the drawing, a transformer T is suitably connected to supply appropriate filament and plate currents to a pair of triode thermionic valves A and B and to a tetrode thermionic valve C. The anode current of the tetrode valve C between its anode 15 and cathode 16 is passed through a resistor 10, and the voltage drop thereby created, smoothed by a condenser 18, is applied across the grids 11, 12 and cathodes 13, 14 of the triode valves A and B. The voltage drop across the welding gap is applied across a potentiometer resistor 20 and a desired portion of such voltage drop is tapped from the resistor 20 and applied to a rectifier 30 of the full wave bridge type. The direct current output of the rectifier 30 is applied across a potentiometer resistor 21, the impulses being smoothed by a suitable condenser 25. Another, fixed resistor 22 is connected from an end of the resistor 21 to the cathode 16 and to the shield grid 17 of the tetrode valve C. The variable tap of the potentiometer resistor 21 is connected to the control grid 23 of the tetrode valve C.

The triode valves A and B are of the negative grid type which passes current continuously unless a negative potential of, say, 3 volts or more is applied across the grid and cathode. Triodes sold under the designation "Thyratron 81," i. e., negative grid type thyratrons, have been used successfully for the purpose.

The tetrode valve C should also be of the negative grid type, suitably one which passes current only when a zero or positive potential is applied between the control grid and the cathode and ceases to pass current when negative potential, even of very small valve, is so applied. Tetrodes sold as "Thyratron 2051," i. e., negative grid type thyratrons, have been used successfully. A triode valve of suitable electrical characteristics may be substituted for the tetrode, provided it is sufficiently sensitive to small changes in grid-cathode voltage drop near the critical.

Ballast resistors (not shown) may be inserted in each grid circuit to protect the grids if desired.

The rectifier 30 is of a standard selenium fullwave, bridge type. Other types of full-wave rectifiers may of course be used, for instance a thermionic valve rectifier; but the additional apparatus required will not ordinarily be justified by materially improved results.

If direct current is used across the welding gap, the rectifier 30, and the condenser 25 may be, but need not be omitted from the circuit.

The transformer T is provided with four secondary windings 26, 27, 28, and 29. The ends of one winding 26 are connected respectively to the anodes 19, 24 of the triodes A and B, a center tap of this winding being connected to one input terminal of the welding electrode feed motor or other device to be controlled by the system. A second winding 27 is connected to supply current to each of the parallel-connected filament-cathodes 13, 14 of the triodes A and B, a center tap of this winding being connected to the other input terminal of the welding electrode feed motor and also being connected to an end of the resistor 10 to complete the grid-cathode outside circuit of the triodes A and B. The third winding 28 is connected to supply current to the filament 31 of the tetrode C, a center tap of this winding being connected to the shield grid 17 and to the cathode 16 of this tetrode. A fixed resistor 22, is connected to the cathode of the tetrode C and to one end of the third winding 28. The fourth winding 29 provides the anode-cathode current for the tetrode C, one end being connected to the resistor 10 in such circuit and the other end being connected to the cathode of the tetrode C.

A condenser 18 is connected across the resistor 10 to maintain the current more than one full cycle but not so long as to interfere with the prompt opening (rendering conductive) of triodes A, B when tetrode C closes (is rendered non-conductive).

The number of turns in each of the secondary windings 26, 27, 28, 29, will of course depend upon the characteristics of the thermionic valves and upon the voltage required by the electrode feed motor or other device to be controlled. In a typical instance in which "Thyratron" valves types 81 and 2051 were used, and the electrode feed motor required about 125 volt current, the first winding 26 was designed to deliver 250 volts (125 volts at the center tap), the second winding 27 to deliver 2.5 volts, the third winding 28 to deliver 6.3 volts, and the fourth winding 29 to deliver 50 volts.

The resistance of the resistor 10 in the grid-cathode circuit of the triodes A, B, is not critical provided that it does not overload the tetrode C. As an example, when the winding 29 provides 50 volts, a current of ten milliamperes through the resistor 10 is appropriate.

The resistor 22 is so connected across the cathode winding 28 of the transformer that the end adjacent the potentiometer resistor 21 is positive when the anode of the tetrode C is positive. The sum of the voltage drops across the adjacent resistors 22 and 21 is applied across the grid and cathode of the tetrode C.

When no voltage is applied across the welding gap, and hence none across the potentiometer resistor 20, the voltage drop across the fixed resistor 22 results in a corresponding voltage drop across the grid 23 and the cathode 16 of the tetrode valve C, permitting this valve to deliver current continuously in its anode circuit. This latter current in its passage through the resistor 10 effects a voltage drop across the grid-cathode circuit of the triodes A, B, preventing those valves from delivering current to the electrode feed motor. The condenser 25 insures the continuance of current over at least a full cycle.

When welding voltage is applied across the welding gap and hence across the potentiometer resistor 20, a portion of the resulting voltage drop is applied, through the rectifier 30, across the resistor 21 where it opposes the voltage across the neighboring resistor 22. When such opposing voltage exceeds the opposed voltage by the amount of the critical voltage, the tetrode valve C promptly ceases to deliver current in its anode circuit, there is no voltage drop across the resistor 10, and consequently the triodes A, B, deliver current to the electrode feeding motor.

The potentiometer resistors 20, 21 can be adjusted so that at and above any desired welding voltage, current is delivered to the electrode feeding motor, and that as soon as the welding gap has so shortened (by reason of the feeding of the electrode towards the workpiece) as to decrease the welding voltage to below the desired value the current flow to the feeding motor will cease.

The response of the control system is extremely rapid. In actual use to control an electrode feed motor the current is interrupted many times a second, resulting in a substantially constant rate of feed of the electrode.

I claim:

1. An electrical control system, for delivering current to a first circuit while, and only while, the voltage drop in a second circuit exceeds a desired value, which system comprises a transformer adapted for connection to a source of alternating current and provided with a plurality of secondary windings; a pair of triode thermionic electric valves arranged and connected to receive alternating current from secondary windings of said transformer and to deliver full-wave rectified current to said first circuit; a third thermionic electric valve arranged and connected to receive alternating current from another secondary winding of said transformer and to deliver unidirectional current through an anode-cathode external circuit; an impedance in said anode-cathode circuit of said third valve, said impedance also being connected in a grid-cathode circuit of said pair of triode valves to apply a voltage drop sufficient to render said valves non-conductive; a first resistor arranged and connected across a secondary winding of said transformer and also connected across a grid and cathode of said third valve to apply a voltage sufficient to render said third valve conductive; and a second resistor connected to receive unidirectional current at a voltage directly related to the voltage drop in said second circuit and to apply to the grid-cathode circuit of said third valve a voltage opposed to that applied by said first resistor.

2. A control system as claimed in claim 1, including a condenser connected across the impedance in the anode-cathode circuit of the said third valve; a full-wave rectifier connected across the input of said second resistor; a potentiometer resistor connected across the input leads of said rectifier; and a condenser connected across the output leads of said rectifier.

3. An electrical control system for delivering rectified alternating current to a first current consuming device while, and only while, a voltage drop in a second current consuming device exceeds a desired value, which system comprises: a main circuit including an input adapted to be connected to a source of alternating current, an output adapted to be connected to said first current consuming device, and a first grid controlled thermionic valve device for rectifying and controlling the flow of current from said input to said output; a first grid biasing circuit adapted to be connected to a source of alternating current and including the grid and cathode of said first valve device, a resistor, and the anode and cathode of a second grid controlled thermionic valve device for rectifying and controlling the flow of current in said grid biasing circuit, such grid biasing circuit normally applying to the first mentioned valve device a grid bias sufficient to render the same non-conductive; a second grid biasing circuit adapted to be connected to a source of alternating current and including the grid and cathode of said second valve device, said connection being such that the second valve is normally conductive; and another circuit for impressing on said second grid bias circuit a direct current variable potential opposed to the potential therein and including means for supplying the direct current and means for varying its potential sufficiently to render said second valve non-conductive.

4. Control system as claimed in claim 3, in which the direct-current supply means in said other circuit comprises a full-wave bridge selenium rectifier.

5. Control system as claimed in claim 3, in which a condenser is connected across said resistor in said first grid biasing circuit.

6. In an electrical control system, the combination comprising a normally non-conductive space discharge rectifier device adapted to deliver direct current when said device fires, and means for firing said device to control the value of a characteristic which is responsive to said direct current, including a normally conductive space discharge rectifier device having an output circuit coupled by an impedance to the input circuit of said normally non-conductive space discharge rectifier device, and means responsive to said characteristic for rendering non-conductive said normally conductive space discharge rectifier device, which in turn, through the operation of said impedance, fires said normally non-conductive space discharge rectifier device, so that the system automatically functions to maintain the value of such characteristic substantially constant.

7. An electrical control system comprising a pair of space discharge rectifier devices of the negative grid type having a common output circuit adapted to deliver full-wave rectified current when said devices are fired, and means for firing said devices to control a characteristic which is responsive to the duration of said current, including a sensitive space discharge rectifier device of the negative grid type which is sensitive to small changes in voltage applied to its control grid, means comprising a relatively high impedance coupling the output circuit of said sensitive space discharge rectifier device to the common input circuit of said pair of space discharge rectifier devices, so that the latter are prevented from firing when the sensitive space discharge rectifier device fires, means including a potentiometer in the input circuit thereof normally acting to cause said sensitive space discharge rectifier device to fire, and means responsive to said characteristic for causing said potentiometer to deenergize said device, with the result that said pair of space discharge rectifier devices are fired and deliver current until the value of said characteristic changes sufficiently to cause said device to fire again, the rapid response of the system keeping such characteristic substantially constant.

8. The combination with an automatic control circuit comprising full-wave thyratron rectifier means subject to undesirable operation due to temperature changes, of means for overcoming such difficulty, comprising a trigger circuit including a negative grid type thyratron operatively coupled to the input circuit of said full-wave rectifier means, so that said negative grid type thyratron is normally conductive and thereby renders said rectifier means non-conductive, the trigger circuit acting in response to a predetermined change to render said negative grid type thyratron non-conductive and the rectifier means conductive to compensate for such change.

JOHN A. KRATZ.

REFERENCES CITED

The following references are of record in the file of this patent:

UNITED STATES PATENTS

| Number | Name | Date |
| --- | --- | --- |
| 1,654,937 | Knight | Jan. 3, 1928 |
| 1,893,772 | Garman | Jan. 10, 1933 |
| 1,943,088 | Power | Jan. 9, 1934 |
| 2,119,130 | Ehrensperger | May 31, 1938 |
| 2,232,694 | Duinker | Feb. 25, 1941 |
| 2,236,015 | Sonnentag | Mar. 25, 1941 |
| 2,260,570 | Clapp | Oct. 28, 1941 |
| 2,282,522 | Kratz (1) | May 12, 1942 |
| 2,348,259 | Kratz (2) | May 9, 1944 |